(12) United States Patent
Yanai

(10) Patent No.: US 8,885,970 B2
(45) Date of Patent: Nov. 11, 2014

(54) IMAGE PROCESSING APPARATUS, METHOD, AND MEDIUM FOR CORRECTING PIXEL VALUES USING PARAMETERS CORRESPONDING TO IMAGE SPATIAL FREQUENCIES

(75) Inventor: Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 12/763,838

(22) Filed: Apr. 20, 2010

(65) Prior Publication Data

US 2010/0296751 A1 Nov. 25, 2010

(30) Foreign Application Priority Data

May 22, 2009 (JP) ................. 2009-124721

(51) Int. Cl.
G06K 9/40 (2006.01)
H04N 1/60 (2006.01)

(52) U.S. Cl.
CPC .................. H04N 1/6019 (2013.01)
USPC ....................................................... 382/274

(58) Field of Classification Search
CPC ....................................................... G06T 5/007
See application file for complete search history.

(56) References Cited

U.S. PATENT DOCUMENTS

| 5,541,743 | A | 7/1996 | Shiomi et al. | |
| 7,054,501 | B1 * | 5/2006 | Gindele et al. | 382/266 |
| 7,231,072 | B2 | 6/2007 | Yamano et al. | |
| 7,418,132 | B2 * | 8/2008 | Hoshuyama | 382/167 |
| 7,602,401 | B2 * | 10/2009 | Nishida et al. | 345/589 |
| 2002/0051578 | A1 * | 5/2002 | Imagawa et al. | 382/224 |
| 2005/0270584 | A1 * | 12/2005 | Trifonov et al. | 358/3.26 |
| 2006/0165163 | A1 * | 7/2006 | Burazerovic et al. | 375/240.03 |
| 2006/0215194 | A1 * | 9/2006 | Gotoh et al. | 358/1.9 |
| 2009/0040398 | A1 * | 2/2009 | Kasahara | 348/759 |
| 2009/0097775 | A1 * | 4/2009 | Monobe et al. | 382/268 |
| 2009/0190837 | A1 * | 7/2009 | Forutanpour | 382/203 |

FOREIGN PATENT DOCUMENTS

| JP | 7-333822 | 12/1995 |
| JP | 10-56570 A | 2/1998 |
| JP | 2000-307870 A | 11/2000 |
| JP | 2003-324610 A | 11/2003 |

* cited by examiner

Primary Examiner — Bhavesh Mehta
Assistant Examiner — Andrew Moyer
(74) Attorney, Agent, or Firm — Fitzpatrick, Cella, Harper & Scinto

(57) ABSTRACT

Image processing apparatus in which a spatial frequency around a pixel of interest and a statistic value of pixel values around the pixel of interest are calculated based on a pixel value of the pixel of interest and a pixel value of a pixel around the pixel of interest. Correction parameters are stored corresponding to sets of spatial frequencies and statistic values. A correction parameter is acquired corresponding to the spatial frequency around the pixel of interest and the statistic value of the pixel values around the pixel of interest, as a correction parameter for the pixel of interest. The pixel value of the pixel of interest is corrected using the correction parameter for the pixel of interest.

7 Claims, 16 Drawing Sheets

F I G. 2A
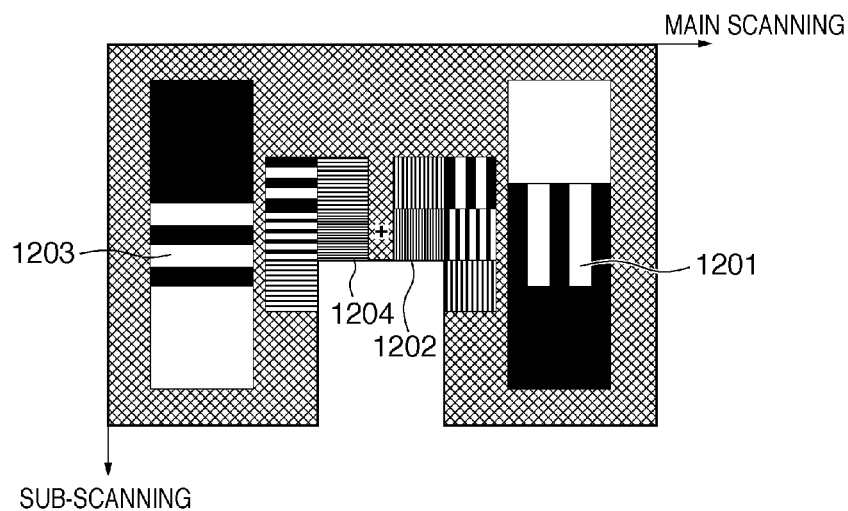
F I G. 2B
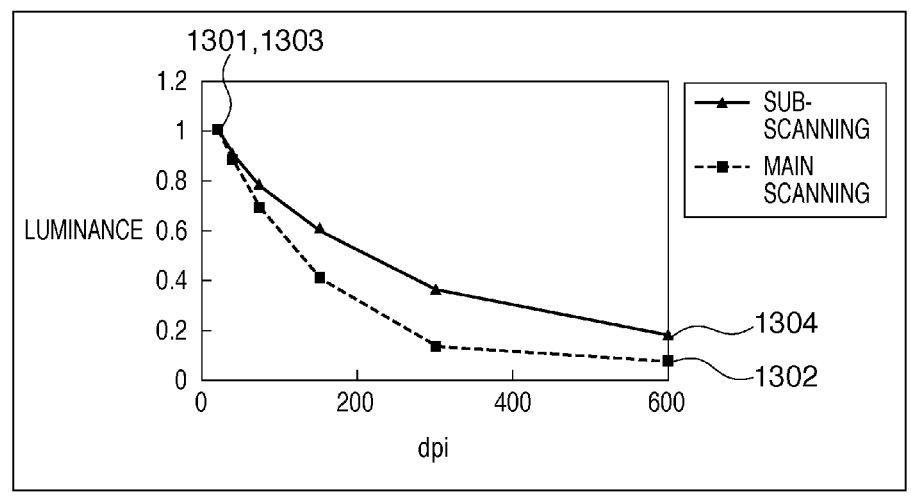

FIG. 7

|  1401 | 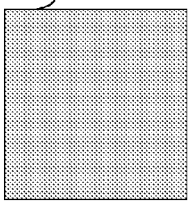 1403 | 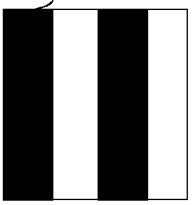 1405 |
|---|---|---|
| DIRECTION Y<br>SPATIAL FREQUENCY : 0.369 [cpm]<br>PIXEL VALUE DISTRIBUTION : AVERAGE 128, CONTRAST 255 | DIRECTION Y<br>SPATIAL FREQUENCY : 0.369 [cpm]<br>PIXEL VALUE DISTRIBUTION : AVERAGE 128, CONTRAST 32 | DIRECTION X<br>SPATIAL FREQUENCY : 0.369 [cpm]<br>PIXEL VALUE DISTRIBUTION : AVERAGE 128, CONTRAST 255 |
| (a) | (c) | (e) |
| 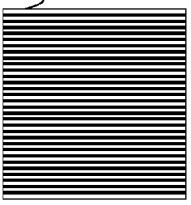 1402 | 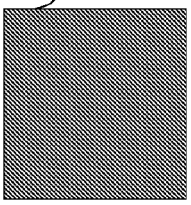 1404 | |
| DIRECTION Y<br>SPATIAL FREQUENCY : 11.8 [cpm]<br>PIXEL VALUE DISTRIBUTION : AVERAGE 128, CONTRAST 255 | DIRECTION Y<br>SPATIAL FREQUENCY : 0.369 [cpm]<br>PIXEL VALUE DISTRIBUTION : AVERAGE 64, CONTRAST 32 | |
| (b) | (d) | |

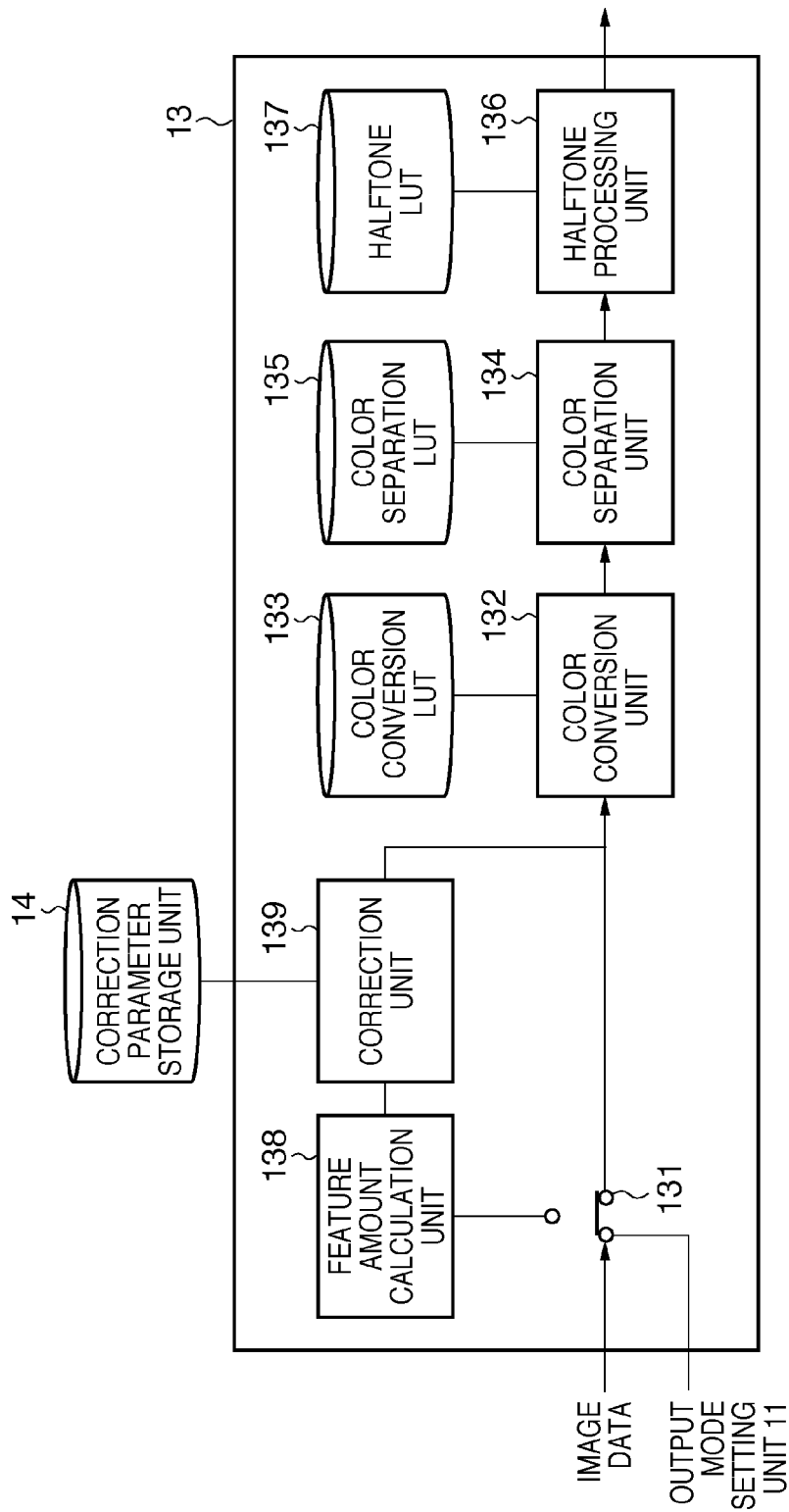

FIG. 12A
1701

| FREQUENCY ω [cpm] | CONTRAST ct [1Max-1Min] | AVERAGE VALUE Ave | REDUCTION RATE Rf_m_y |
|---|---|---|---|
| 0.369 | 255 | 128 | 0.99 |
| 0.738 | 255 | 128 | 0.90 |
| 1.475 | 255 | 128 | 0.75 |
| 2.95 | 255 | 128 | 0.62 |
| 5.9 | 255 | 128 | 0.43 |
| 11.8 | 255 | 128 | 0.21 |
| 0.369 | 240 | 120 | 0.98 |
| 0.738 | 240 | 120 | 0.92 |
| 1.475 | 240 | 120 | 0.78 |
| 2.95 | 240 | 120 | 0.65 |
| 5.9 | 240 | 120 | 0.51 |
| 11.8 | 240 | 120 | 0.25 |
| 0.369 | 208 | 104 | 0.99 |
| 0.738 | 208 | 104 | 0.98 |
| 1.475 | 208 | 104 | 0.93 |
| 2.95 | 208 | 104 | 0.79 |
| · · · · · | | | |

FIG. 12B
1702

| FREQUENCY ω [cpm] | CONTRAST ct [1Max-1Min] | AVERAGE VALUE Ave | REDUCTION RATE Rf_m_x |
|---|---|---|---|
| 0.369 | 255 | 128 | 0.99 |
| 0.738 | 255 | 128 | 0.82 |
| 1.475 | 255 | 128 | 0.58 |
| 2.95 | 255 | 128 | 0.31 |
| 5.9 | 255 | 128 | 0.15 |
| 11.8 | 255 | 128 | 0.10 |
| 0.369 | 240 | 120 | 0.98 |
| 0.738 | 240 | 120 | 0.85 |
| 1.475 | 240 | 120 | 0.63 |
| 2.95 | 240 | 120 | 0.43 |
| 5.9 | 240 | 120 | 0.18 |
| 11.8 | 240 | 120 | 0.15 |
| 0.369 | 208 | 104 | 0.99 |
| 0.738 | 208 | 104 | 0.88 |
| 1.475 | 208 | 104 | 0.69 |
| 2.95 | 208 | 104 | 0.35 |
| · · · · · | | | |

| FREQUENCYω [cpm] | CONTRAST ct [1Max-1Min] | AVERAGE VALUE Ave | REDUCTION RATE Rf_t_y |
|---|---|---|---|
| 0.123 | 255 | 128 | 1.0 |
| 0.246 | 255 | 128 | 1.0 |
| 0.492 | 255 | 128 | 1.0 |
| 0.983 | 255 | 128 | 1.0 |
| 1.97 | 255 | 128 | 1.0 |
| ⋯ | | | |

| FREQUENCYω [cpm] | CONTRAST ct [1Max-1Min] | AVERAGE VALUE Ave | REDUCTION RATE Rf_t_x |
|---|---|---|---|
| 0.123 | 255 | 128 | 1.0 |
| 0.246 | 255 | 128 | 1.0 |
| 0.492 | 255 | 128 | 1.0 |
| 0.983 | 255 | 128 | 1.0 |
| 1.97 | 255 | 128 | 1.0 |
| ⋯ | | | |

F I G. 14
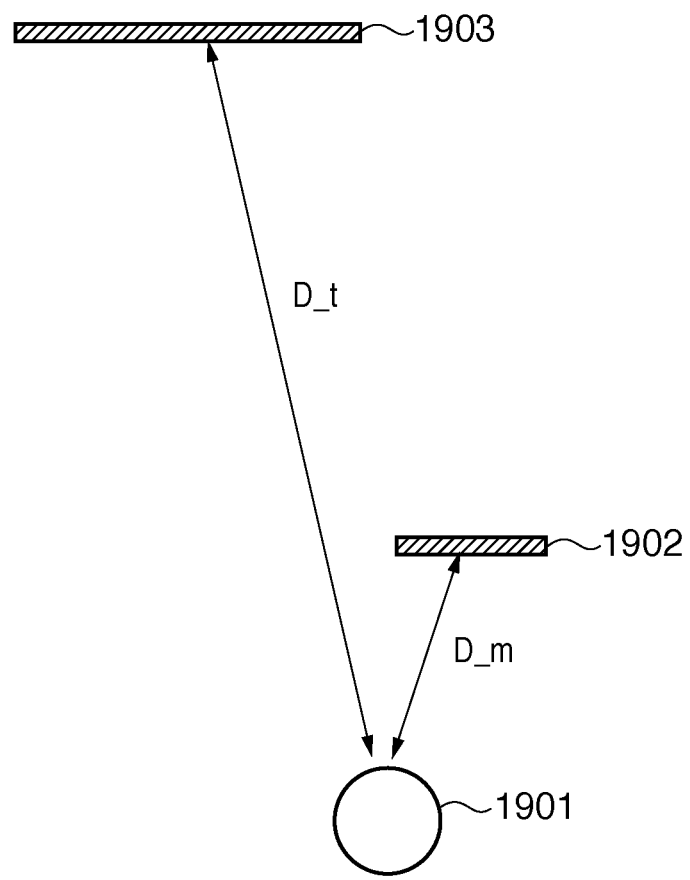

FIG. 15A

| FREQUENCY ω [cpm] | CONTRAST ct [1Max-1Min] | AVERAGE VALUE Ave | CORRECTION PARAMETER H_h |
|---|---|---|---|
| 0.369 | 255 | 128 | 1.01 |
| 0.738 | 255 | 128 | 1.11 |
| 1.475 | 255 | 128 | 1.33 |
| 2.95 | 255 | 128 | 1.61 |
| 5.9 | 255 | 128 | 2.33 |
| 11.8 | 255 | 128 | 4.76 |
| 0.369 | 240 | 120 | 1.02 |
| 0.738 | 240 | 120 | 1.09 |
| 1.475 | 240 | 120 | 1.28 |
| 2.95 | 240 | 120 | 1.54 |
| 5.9 | 240 | 120 | 1.96 |
| 11.8 | 240 | 120 | 4.00 |
| 0.369 | 208 | 104 | 1.01 |
| 0.738 | 208 | 104 | 1.02 |
| 1.475 | 208 | 104 | 1.08 |
| 2.95 | 208 | 104 | 1.27 |
| ... | | | |

| FREQUENCY ω [cpm] | CONTRAST ct [1Max-1Min] | AVERAGE VALUE Ave | CORRECTION PARAMETER H_x |
|---|---|---|---|
| 0.369 | 255 | 128 | 1.01 |
| 0.738 | 255 | 128 | 1.22 |
| 1.475 | 255 | 128 | 1.72 |
| 2.95 | 255 | 128 | 3.23 |
| 5.9 | 255 | 128 | 6.67 |
| 11.8 | 255 | 128 | 10.0 |
| 0.369 | 240 | 120 | 1.02 |
| 0.738 | 240 | 120 | 1.18 |
| 1.475 | 240 | 120 | 1.59 |
| 2.95 | 240 | 120 | 2.33 |
| 5.9 | 240 | 120 | 5.56 |
| 11.8 | 240 | 120 | 6.67 |
| 0.369 | 208 | 104 | 1.01 |
| 0.738 | 208 | 104 | 1.14 |
| 1.475 | 208 | 104 | 1.45 |
| 2.95 | 208 | 104 | 2.86 |
| ... | | | |

| -0.00677 | -0.00794 | -0.01028 | -0.0109 | -0.00125 | 0.020451 | 0.033369 | 0.020451 | -0.00125 | -0.0109 | -0.01028 | -0.00794 | -0.00677 |
|---|---|---|---|---|---|---|---|---|---|---|---|---|

| -0.05024 | -0.02888 | 0.158256 | -0.02888 | -0.05024 |
|---|---|---|---|---|

| -0.00677 |
| -0.00794 |
| -0.01028 |
| -0.0109 |
| -0.00125 |
| 0.020451 |
| 0.033369 |
| 0.020451 |
| -0.00125 |
| -0.0109 |
| -0.01028 |
| -0.00794 |
| -0.00677 |

| -0.05024 |
| -0.02888 |
| 0.158256 |
| -0.02888 |
| -0.05024 |

3104

IMAGE PROCESSING APPARATUS, METHOD, AND MEDIUM FOR CORRECTING PIXEL VALUES USING PARAMETERS CORRESPONDING TO IMAGE SPATIAL FREQUENCIES

BACKGROUND OF THE INVENTION

1. Field of the Invention

The present invention relates to a technique to correct a color output from a device.

2. Description of the Related Art

Image output devices are roughly classified into intensity modulation (density modulation) type output devices and dot area modulation type output devices. There are various intensity modulation type output devices. Typical examples are a CRT, liquid crystal display, and sublimation printer compatible with multi-bit output. On the other hand, there are various dot area modulation type output devices. Typical examples are an inkjet printer and an electrophotographic printer.

The intensity modulation type output device expresses grayscale by the luminance level of each pixel. In the output of the intensity modulation type output device, each pixel does not overlap an adjacent pixel. The intensity modulation type output device is designed not to easily change the size of a pixel depending on the luminance level. As is known, if adjacent pixels overlap, or the size of a pixel changes in accordance with the luminance, the luminance characteristic becomes nonlinear. In the intensity modulation type output device, if the average pixel value of image data is the same, the output luminance characteristic hardly changes even when the luminance pattern (spatial frequency characteristic) has changed.

On the other hand, the dot area modulation type output device expresses grayscale by the area of each pixel. Especially in an inkjet printer or electrophotographic printer, an ink dot or toner dot corresponding to a pixel is designed to be relatively large with respect to the output resolution. Dots that are designed relatively large readily overlap. As is known, if the dots overlap, the luminance characteristic generally becomes nonlinear. Hence, in principle, in the inkjet printer or electrophotographic printer, even if the average pixel value of image data is the same, the output luminance characteristic readily changes when the dot pattern (spatial frequency characteristic) has changed.

Recently, a correction technique to match the color of a dot area modulation type output device with that of an intensity modulation type output device (color matching) has been proposed. A correction technique of matching the color of an intensity modulation type output device with that of a dot area modulation type output device and a correction technique of matching the color of a dot area modulation type output device with an ideal color have also been proposed. For example, Japanese Patent Laid-Open No. 7-333822 discloses a technique of performing color correction of the above-described dot area modulation type output device such as a printer. According to the invention described in Japanese Patent Laid-Open No. 7-333822, when printing using a plurality of kinds of dots with different print characteristics, the tone characteristic of an image signal is corrected in accordance with the dot gain characteristic.

According to the invention described in Japanese Patent Laid-Open No. 7-333822, a high color correction accuracy can be obtained for an image region whose spatial frequency is almost zero. However, when an image contains high-frequency components and has a changeable pixel value distribution (for example, contrast, average value, and histogram), the color correction accuracy degrades.

For example, FIG. 1A illustrates images output by a liquid crystal display that is an intensity modulation type output device. In FIG. 1A, reference numerals 1001 and 1002 denote input images each having different spatial frequencies in the X direction. In the example of FIG. 1A, the spatial frequency of the input image 1001 is 12.5 dpi, and the spatial frequency of the input image 1002 is 100 dpi. FIG. 1B shows average luminances 1101 and 1102 at this time. As is apparent from FIG. 1B, even when the spatial frequencies are different, the average luminance is not different. In FIG. 1A, reference numerals 1003 and 1004 denote input images each having different spatial frequencies in the Y direction. The spatial frequency of the input image 1003 is 12.5 dpi, like the input image 1001. The spatial frequency of the input image 1004 is 100 dpi, like the input image 1002. As is apparent from FIG. 1B, even when the spatial frequencies are different, the average luminance is not different in this case as well.

FIG. 2A illustrates images output by an inkjet printer that is a dot area modulation type output device. The images shown in FIG. 2A use the error diffusion method as halftone processing. As the error diffusion method, conventional processing using an appropriate γ table is performed. In FIG. 2A, reference numerals 1201 and 1202 denote input images each having different spatial frequencies in the main scanning direction (X direction), as in FIG. 1A. In the example of FIG. 2A, the spatial frequency of the input image 1201 is 18.75 dpi. The spatial frequency of the input image 1202 is 600 dpi. FIG. 2B shows average luminances 1301 and 1302 in this case. As is apparent from FIG. 2B, when the spatial frequencies of input images are different, the average luminances are also different. In addition, if the input image has a high frequency, the output image becomes dark.

In FIG. 2A, reference numerals 1203 and 1204 denote input images each having different spatial frequencies in the sub-scanning direction (Y direction). FIG. 2B shows average luminances 1303 and 1304 in this case. As is apparent from FIG. 2B, when the spatial frequencies of input images are different, the average luminances are also different, and if the input image has a high frequency, the output image becomes dark even in the sub-scanning direction (Y direction). Furthermore, the luminance characteristic is different from that in the main scanning direction (X direction), as can be seen.

A possible cause of the above problems is that the γ table used in the above-described technique is generated based on data obtained by measuring a plurality of color patches by a colorimeter or the like. In other words, a possible cause is that the correction is suitable for a region whose spatial frequency is almost zero. As a result, when the spatial frequency, frequency direction, and pixel value distribution (for example, contrast, average value, histogram, minimum value, and maximum value) of an input image change, the color correction accuracy degrades.

SUMMARY OF THE INVENTION

The present invention has been made to solve the above-described problems, and can provide a method of improving the accuracy of color correction performed when outputting input image data having spatial frequency components.

According to one aspect of the invention, an image processing apparatus comprises: a calculation unit configured to calculate, based on a pixel value of a pixel of interest and a pixel value of a pixel around the pixel of interest, a spatial frequency around the pixel of interest and a statistic value of pixel values around the pixel of interest; a storage unit configured to store correction parameters corresponding to sets of spatial frequencies and statistic values; an acquisition unit configured to acquire, from the storage unit, a correction parameter corresponding to the spatial frequency around the pixel of interest and the statistic value of the pixel values around the pixel of interest, as a correction parameter for the pixel of interest; and a correction unit configured to correct the pixel value of the pixel of interest using the correction parameter for the pixel of interest.

Further features of the present invention will become apparent from the following description of exemplary embodiments (with reference to the attached drawings).

BRIEF DESCRIPTION OF THE DRAWINGS

FIGS. 2A and 2B illustrate outputs of an inkjet printer that is a dot area modulation type output device;

FIGS. 7A to 7E are views showing examples of images used in the output measurement mode;

FIG. 8 is a block diagram showing the arrangement of an image processing unit 13;

FIGS. 12A and 12B are tables showing examples of data obtained by processing of obtaining a measured reduction rate;

FIGS. 13A and 13B are tables showing the formats of target data;

FIG. 14 is a schematic view showing the positional relationship between an observer, a correction output, and a target device;

FIGS. 15A and 15B are tables showing examples of correction parameters calculated by a correction parameter calculation unit 42;

FIGS. 18A to 18D are views showing examples of filters to be used to calculate a frequency in step S402.

DESCRIPTION OF THE EMBODIMENTS

Figure 5:
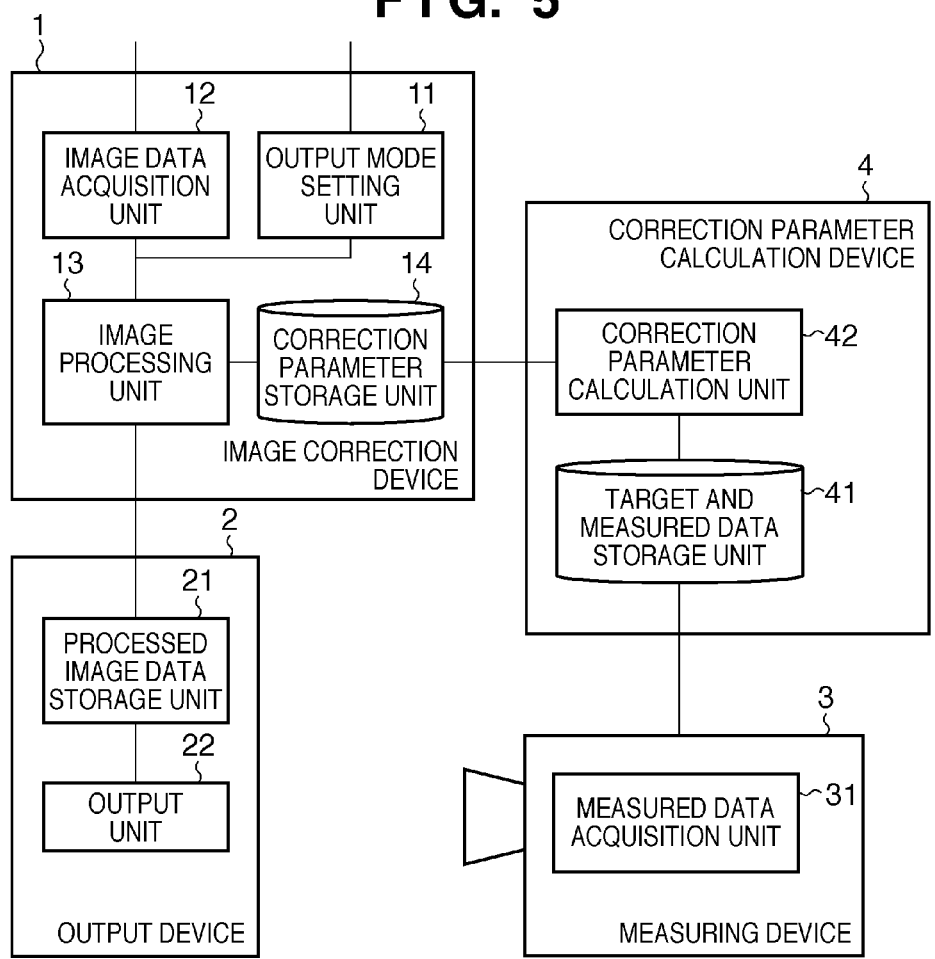
FIG. 5 is a block diagram showing the arrangement of an image processing apparatus according to the first embodiment.

Preferred embodiments will now be described with reference to the accompanying drawings.
<First Embodiment>
FIG. 5 is a block diagram showing the arrangement of an image processing apparatus according to this embodiment. Referring to FIG. 5, reference numeral 1 denotes an image correction device; 2, an output device; 3, a measuring device; and 4, a correction parameter calculation device.

The image correction device 1 can be implemented by, for example, a printer driver installed in a general personal computer. In that case, the units of the image correction device 1 to be described below are implemented by causing the computer to execute a predetermined program. This will be described later in detail. As another arrangement, for example, the output device 2 may include the image correction device 1.

The outline of the image processing apparatus according to this embodiment will be explained below. In the image correction device 1, first, an output mode setting unit 11 acquires a user instruction, and selects an output mode in accordance with the user instruction. More specifically, the output mode setting unit 11 selects a "output measurement mode" or a "output correction mode". Processes of the devices according to the embodiment change between the "output measurement mode" and the "output correction mode". Details will be described later. An image data acquisition unit 12 acquires and stores image data.

When the output mode selected by the output mode setting unit 11 is the "output measurement mode", an image processing unit 13 processes reference image data without using correction parameters held by a correction parameter-storage unit 14. If the output mode is the "output correction mode", the image processing unit 13 processes the image data held by the image data acquisition unit 12 using the correction parameters in the correction parameter-storage unit 14, thereby generating corrected image data.

In the output device 2, a processed image data storage unit 21 acquires and stores the corrected image data. An output unit 22 outputs the corrected image data stored in the processed image data storage unit 21. In the measuring device 3, a measured data acquisition unit 31 measures the image output from the output unit 22, and acquires measured data.

In the correction parameter calculation device 4, a target and measured data storing unit 41 acquires and stores the measured data measured by the measured data acquisition unit 31. The target and measured data storing unit 41 also stores target data (set value) representing an ideal output. The target data may be held in a target data storage unit 43 (not shown) in advance. Alternatively, the target data storage unit 43 may acquire the target data when the reference image data has been acquired. Details of the target data will be described later. A correction parameter calculation unit 42 calculates correction parameters from the target data and measured data stored in the target and measured data storing unit 41. The correction parameters are used to correct the luminance value of each pixel constituting a region with a specific feature amount in the image before sending it to the output device (output unit 22). The correction parameter calculation unit 42 also transfers the calculated correction parameters to the correction parameter-storage unit 14 of the image correction device 1. The correction parameter-storage unit 14 stores the transferred correction parameters. For example, the correction parameter-storage unit 14 stores the correction parameters in its internal memory.

[Output Measurement]

Figure 6:
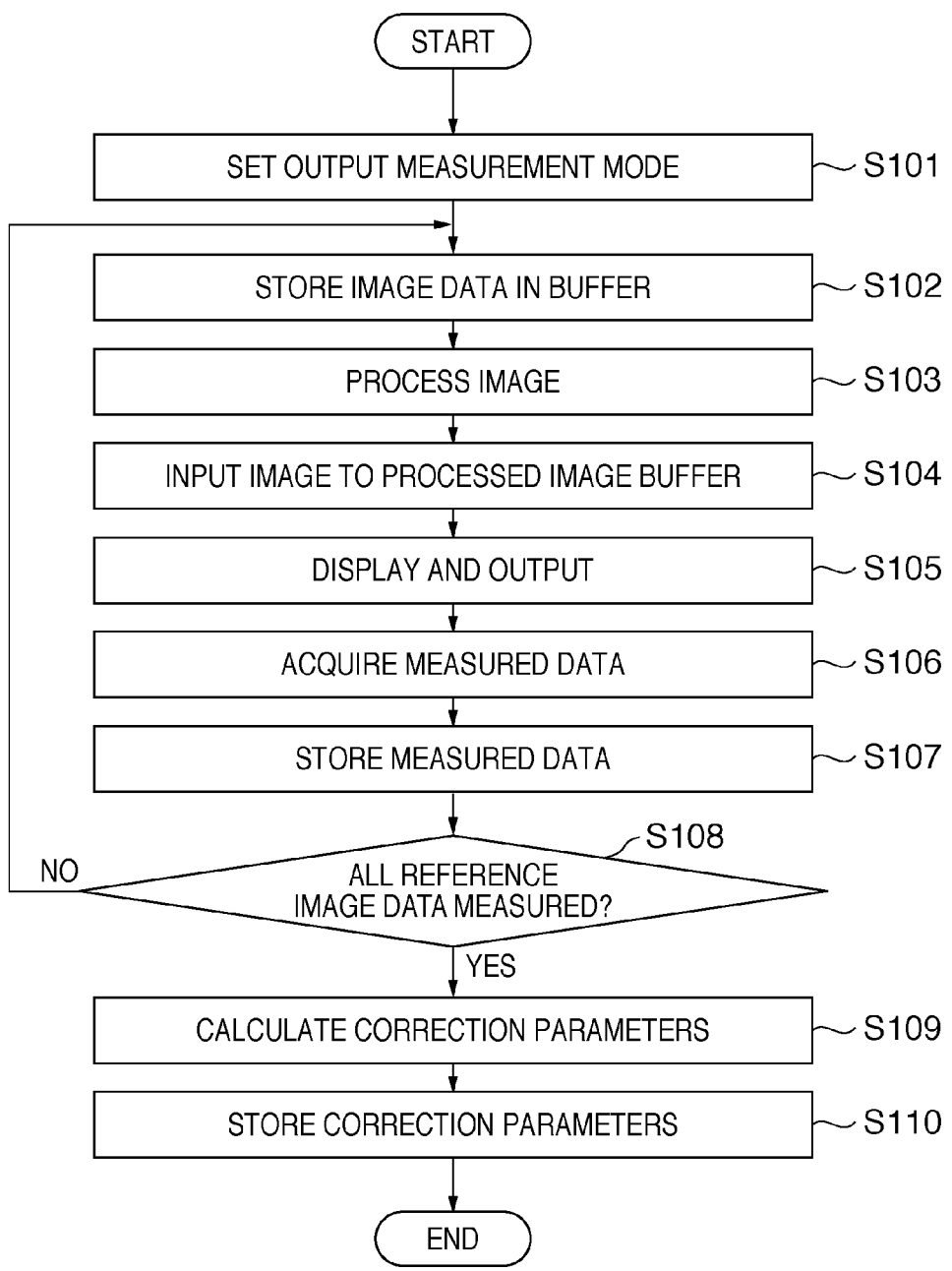
FIG. 6 is a flowchart illustrating processing in a output measurement mode.

The "output measurement mode" of the image processing apparatus according to this embodiment having the above-described functions will be described next with reference to the flowchart of FIG. 6. First, the output mode setting unit 11 acquires a user instruction, and sets the output mode to the output measurement mode (step S101).

Next, the image data acquisition unit 12 acquires and stores image data as reference image data (step S102). The reference image data acquired in the output measurement mode has known feature amounts (for example, spatial frequency, direction, and pixel value distribution), as shown in FIG. 7. In this embodiment, the spatial frequency, frequency direction, average pixel value, and contrast are used as the feature amounts. The feature amounts will be described later in detail. The target data storage unit 43 may acquire the known feature amounts in step S102. The known feature amounts may be held in the target data storage unit 43 in advance. In this case, the image data acquisition unit 12 may acquire reference image data corresponding to the feature amounts held in the target data storage unit 43.

For example, in an image 1401 shown in FIG. 7A, the spatial frequency in the Y direction is 0.369 [cycle/mm], the average pixel value is 128, and the contrast is 255. The image data acquisition unit 12 also acquires images with known feature amounts, which are obtained by changing the feature amounts, frequency direction, and the like of the image. For example, the image data acquisition unit 12 acquires an image 1402 in FIG. 7B obtained by changing the spatial frequency, an image 1403 in FIG. 7C obtained by changing the contrast, an image 1404 in FIG. 7D obtained by changing the average pixel value, an image 1405 in FIG. 7E obtained by changing the frequency direction, and the like.

Figure 9:
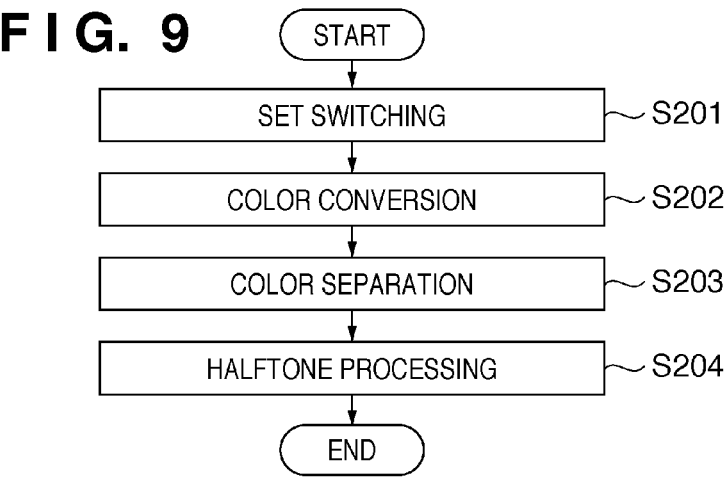
FIG. 9 is a flowchart illustrating details of image processing in step S103.

Next, the image processing unit 13 processes the reference image data acquired by the image data acquisition unit 12 (step S103). A detailed operation of the image processing unit 13 according to this embodiment in the output measurement mode will be described below with reference to the block diagram of FIG. 8 and the flowchart of FIG. 9.

FIG. 8 shows the units of the image processing unit 13. The output mode setting unit 11 sets a switching unit 131 based on the setting acquired from the user (step S201). Note that if the switching unit 131 is set to the output measurement mode, a color conversion unit 132 acquires image data directly without making a feature amount calculation unit 138 and a correction unit 139 intervene. If the switching unit 131 is set to the output correction mode, the feature amount calculation unit 138 acquires image data, and sends the data to the color conversion unit 132 via the correction unit 139. Since the output measurement mode is set here, the operations of the feature amount calculation unit 138 and the correction unit 139 will not be described.

The color conversion unit 132 then converts the image data acquired as R, G, and B data into R', G', and B' data by looking up a color conversion LUT 133 (step S202).

$$R'=R\_LUT\_3D\,(R,G,B) \quad (1)$$

$$G'=G\_LUT\_3D\,(R,G,B) \quad (2)$$

$$B'=B\_LUT\_3D\,(R,G,B) \quad (3)$$

The functions defined on the right-hand sides of equations (1) to (3) correspond to the color conversion LUT 133. Color conversion of this embodiment is thus completed.

Next, a color separation unit 134 converts the R', G', and B' data generated by the color conversion unit 132 into C, M, Y, and K data by looking up a color separation LUT 135 (step S203).

$$C=C\_LUT\_3D\,(R',G',B') \quad (4)$$

$$M=M\_LUT\_3D\,(R',G',B') \quad (5)$$

$$Y=Y\_LUT\_3D\,(R',G',B') \quad (6)$$

$$K=K\_LUT\_3D\,(R',G',B') \quad (7)$$

The functions defined on the right-hand sides of equations (4) to (7) correspond to the color separation LUT 135. The color separation LUT 135 defines the method of converting three input values corresponding to red, green, and blue into output values corresponding to the ink colors. In this embodiment, since the four colors, in other words, C, M, Y, and K are used as outputs, the color separation unit 134 obtains four output values from three input values. However, the outputs are not limited to the four C, M, Y, and K colors. For example, another combination of ink colors such as (C, M, Y, K, Lc, and Lm) or (C, M, Y, K, R, G, and B) is also usable. Color separation of this embodiment is thus completed.

Figure 10A:
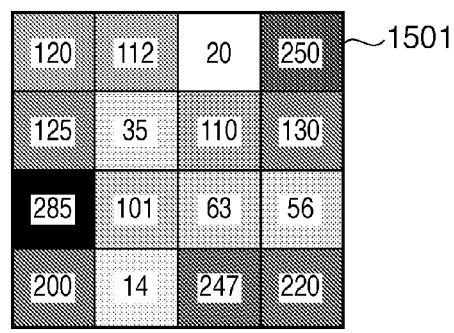
FIGS. 10A to 10C are schematic views showing binarization in step S204.
Figure 10B:
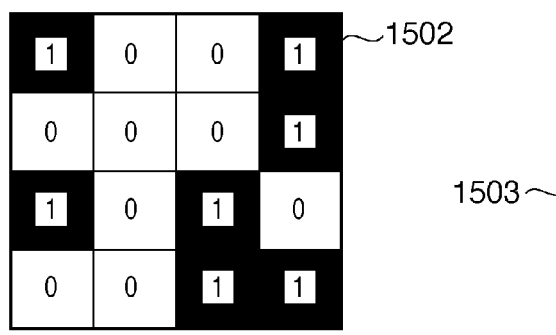
Figure 10C:
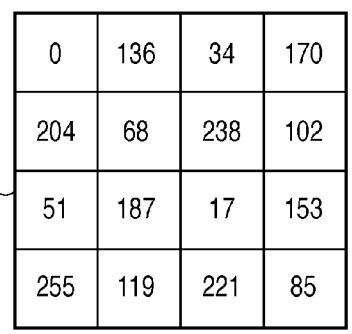

Using a halftone LUT 137, a halftone processing unit 136 converts the data generated by the color separation unit 134 into binary data (step S204). In this embodiment, the halftone processing unit 136 performs binarization by dither processing. However, the halftone processing unit 136 may use a binarization method such as the error diffusion method. For example, FIG. 10A shows data C 1501 before binarization, FIG. 10B shows data Cb 1502 after binarization, and FIG. 10C shows a threshold matrix 1503. The threshold matrix 1503 represents the operation performed by the halftone LUT.

More specifically, in the dither processing of the C, M, Y, and K colors, let Th_C, Th_M, Th_Y, and Th_K be the threshold matrices to be used to determine the dot arrangement. In this case, processing of the halftone processing unit is represented by $$\text{when } C<Th\_C,\, C\_b=0 \quad (8)$$

$$\text{when } Th\_C\le C,\, C\_b=1 \quad (9)$$

$$\text{when } M<Th\_M,\, M\_b=0 \quad (10)$$

$$\text{when } Th\_M\le M,\, M\_b=1 \quad (11)$$

$$\text{when } Y<Th\_Y,\, Y\_b=0 \quad (12)$$

$$\text{when } Th\_Y\le Y,\, Y\_b=1 \quad (13)$$

$$\text{when } K<Th\_K,\, K\_b=0 \quad (14)$$

$$\text{when } Th\_K\le K,\, K\_b=1 \quad (15)$$

The operation of the image processing unit 13 according to this embodiment in the output measurement mode is thus completed.

Referring back to FIG. 6, processing after image processing (step S103) will be described. In the output device 2, the processed image data storage unit 21 acquires and stores the corrected image data processed by the image processing unit 13 (step S104). The output unit 22 outputs the image data stored in the processed image data storage unit 21 (step S105).

In the measuring device 3, the measured data acquisition unit 31 measures the luminance value of the image output from the output unit 22, and obtains the measured luminance value as measured data. In this embodiment, the average luminance of the image output from the output unit 22 is used as the luminance of the image. However, any other value that reflects the luminance, in other words, the color of the image, is usable as the measured data. In this embodiment, the measured data acquisition unit 31 specifically acquires the image output from the output unit 22 as measured image data, and calculates the average pixel value of the measured image data as the average luminance (step S106). In this embodiment, a digital camera is used as the measuring device. However, any other measuring device may be used if it can measure the output with high frequency from the output unit 22 at a sufficient accuracy.

Figure 11:
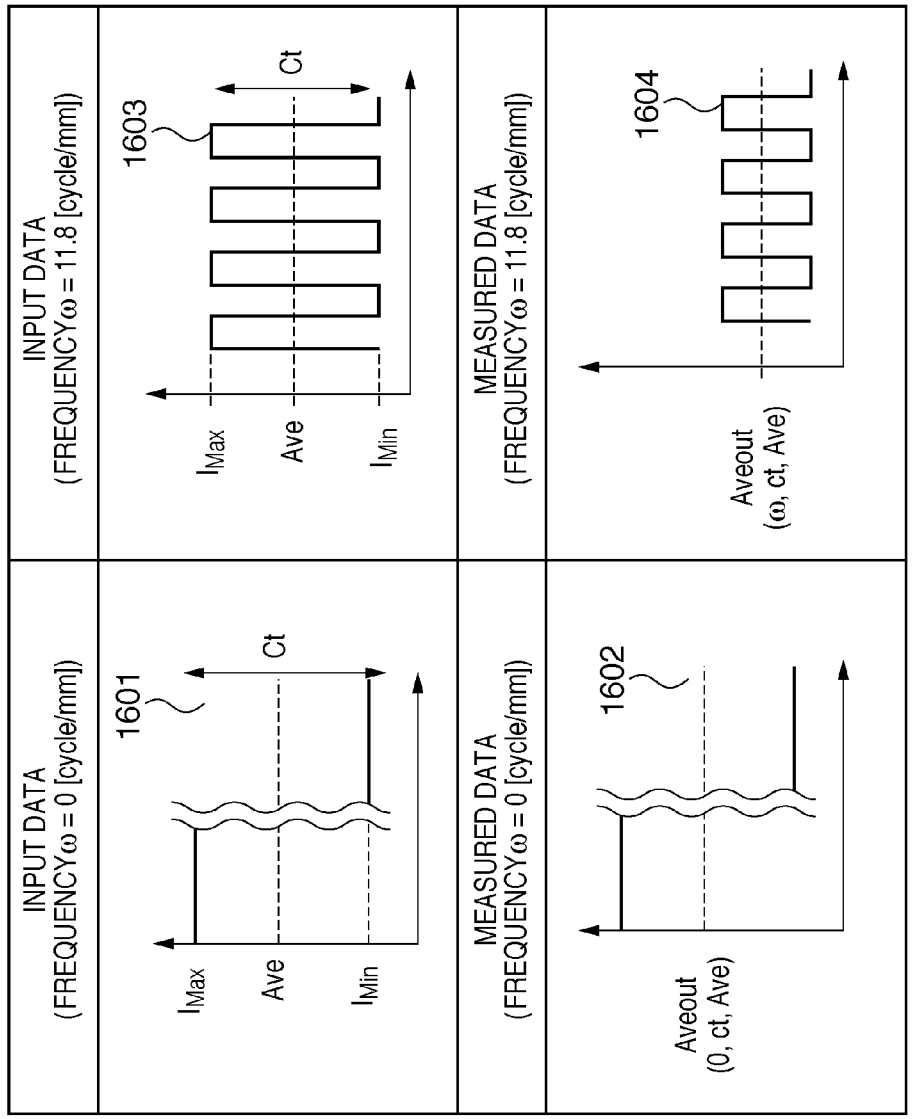
FIG. 11 is a schematic view showing the relationship between input image data and output image data.

FIG. 11 is a schematic view showing the relationship between reference image data and measured image data. Reference numeral 1601 denotes reference image data having a spatial frequency of 0 [cycle/mm]; 1602, measured image data corresponding to the reference image data 1601; 1603, reference image data having a spatial frequency of 11.8 [cycle/mm]; and 1604, measured image data corresponding to the reference image data 1603.

IMax and IMin in FIG. 11 represent the maximum value and minimum value, respectively. The maximum value and minimum value indicate the maximum value and minimum value of R, G, or B pixel values. The maximum value and minimum value are independent values for each of R, G, and B. The measured data acquisition unit 31 may acquire values for only one component, for example, green, and R and B may be assumed to have the same values as those of G. The measured data acquisition unit 31 may acquire the mixed values of R, G, and B.

Referring to FIG. 11, Ave and ct represent the average pixel value and contrast, respectively. The average pixel value and contrast are given by $$\text{Ave}=(I\text{Max}+I\text{Min})/2 \quad (16)$$

$$ct=I\text{Max}-I\text{Min} \quad (17)$$

In this embodiment, the above-described spatial frequency, spatial frequency direction, average pixel value, and contrast are employed as the feature amounts.

Aveout is the average pixel value of the measured image data, which is calculated like Ave. More specifically, the measured data acquisition unit 31 obtains the maximum and minimum pixel values of the measured image data. The measured data acquisition unit 31 then calculates the average of the maximum and minimum pixel values as Aveout. Note that the measured data acquisition unit 31 may calculate, as Aveout, the statistic value of the measured image data, for example, the weighted average of the pixel values or the like, and obtain the Aveout as the measured data of the image output from the output unit 22.

The target and measured data storing unit 41 stores the measured data obtained by the measured data acquisition unit 31, in other words, Aveout which is an average pixel value of the measured data (step S107). The target and measured data storing unit 41 stores the feature amounts of the reference image data in advance, or acquires the feature amounts of the reference image data in step S102. In step S107, the target and measured data storing unit 41 stores a set of the measured data and the feature amounts of the reference image data. In this embodiment, the target and measured data storing unit 41 stores a set of the frequency of the reference image data, the frequency direction of the reference image data, the average pixel value of the reference image data, the contrast of the reference image data, and the measured data obtained by outputting and measuring the reference image data.

In step S108, the correction parameter calculation unit 42 determines whether all reference image data have been measured. The reference image data to be measured may be predetermined. The correction parameter calculation unit 42 may check with the user whether reference image data to be measured remains. If reference image data to be measured still remains, the process returns to step S102 to read out the next reference image data. If all reference image data have been measured, the process advances to step S109.

Subsequently, the correction parameter calculation unit 42 calculates correction parameters H_y and H_x (step S109). The correction parameter calculation unit 42 uses the target data and measured data stored in the target and measured data storing unit 41. The correction parameters are calculated so as to minimize the difference between target data (set value) and the variation between the average pixel value of reference image data expressed by a specific frequency (frequency x) and that of reference image data expressed by another frequency (frequency y).

First, the correction parameter calculation unit 42 acquires the set of the feature amount and measured data from the target and measured data storing unit 41 (set value acquisition). In this embodiment, the correction parameter calculation unit 42 acquires a frequency ω of the reference image data, the frequency direction (X or Y) of the reference image data, the average pixel value Ave of the reference image data, the contrast ct of the reference image data, and the average pixel value Aveout of the measured data. When the frequency of the reference image data in the X direction is ω, the average pixel value of the reference image data is Ave, and the contrast of the reference image data is ct, the average pixel value of measured data is represented by Aveout_x(ω, ct, Ave). When the frequency of the reference image data in the Y direction is ω, the average pixel value of the reference image data is Ave, and the contrast of the reference image data is ct, the average pixel value of measured data is represented by Aveout_y (ω, ct, Ave).

Using these data, the correction parameter calculation unit 42 then obtains the measured reduction rate in the Y direction and the measured reduction rate in the X direction. They are calculated by equations (18) and (19). The measured reduction rate is a numerical value representing a variation between the average pixel value of reference image data (image x) expressed by a specific frequency (frequency x) and the average pixel value of reference image data (image y) expressed by another frequency (frequency y). In this embodiment, the measured reduction rate represents the ratio of Aveout for the frequency ω to Aveout for the frequency 0. More specifically, a numerical value obtained by dividing the average pixel value of the measured data of reference image data whose feature amount is A by the average pixel value of the measured data which corresponds to the reference image data whose frequency is zero and whose feature amount other than frequency equals to A, is defined as the measured reduction rate corresponding to the feature amount A. In this embodiment, since the feature amounts include the frequency direction, the measured reduction rate is obtained for each of the Y and X directions by $$Rf\_m\_y(\omega, ct, \text{Ave})=\text{Aveout}\_y(\omega, ct, \text{Ave})/\text{Aveout}\_y(0, ct, \text{Ave}) \quad (18)$$

$$Rf\_m\_x(\omega, ct, \text{Ave})=\text{Aveout}\_x(\omega, ct, \text{Ave})/\text{Aveout}\_x(0, ct, \text{Ave}) \quad (19)$$

where Rf_m_y and Rf_m_x are the measured reduction rate in the Y direction and that in the X direction, respectively. That is, the correction parameter calculation unit 42 calculates the measured reduction rates Rf_m_y(ω, ct, Ave) and Rf_m_x(ω, ct, Ave) for the set of the frequency ω of the reference image data, the contrast ct of the reference image data, and the average pixel value Ave of the reference image data. When the frequency of the reference image data in the X direction is ω, the average pixel value of the reference image data is Ave, and the contrast of the reference image data is ct, the measured reduction rate is represented by Rf_m_x(ω, ct, Ave). When the frequency of the reference image data in the Y direction is ω, the average pixel value of the reference image data is Ave, and the contrast of the reference image data is ct, the measured reduction rate is represented by Rf_m_y (ω, ct, Ave). FIGS. 12A and 12B show the formats of data actually obtained by the processing. In FIG. 12A, 1701 represents data for the frequency in the Y direction. In FIG. 12B, 1702 represents data for the frequency in the X direction.

Next, the correction parameter calculation unit 42 acquires the target data stored in the target and measured data storing unit 41. The target data is a set of the reduction rate in an ideal output of the reference image data and the feature amounts of the reference image data. Performing correction of making the measured image data closer to the target data allows to make the output image closer to the ideal color.

If the target of color matching is, for example, a liquid crystal display, the target data describes "frequency ω of reference image data", "contrast ct of reference image data", "average pixel value Ave of reference image data", and "target reduction rate Rf_t" for each of the X and Y directions of the liquid crystal display. If the target of color reproduction is an ideal color that is not limited to a device, the target data describes ideal "frequency ω of reference image data", "contrast ct of reference image data", "average pixel value Ave of reference image data", and "target reduction rate Rf_t" for each of the X and Y directions. FIGS. 13A and 13B show the formats of target data. Note that 1801 in FIG. 13A represents target data in the Y direction, and 1802 in FIG. 13B represents target data in the X direction. When the frequency of the reference image data in the X direction is ω, the average pixel value of the reference image data is Ave, and the contrast of the reference image data is ct, the target reduction rate is represented by Rf_t_x(ω, ct, Ave). When the frequency of the reference image data in the Y direction is ω, the average pixel value of the reference image data is Ave, and the contrast of the reference image data is ct, the target reduction rate is represented by Rf_t_y(ω, ct, Ave). Note that the target reduction rate is calculated like the measured reduction rate. More specifically, an average luminance (target luminance for Y) in an ideal output corresponding to the reference image data whose feature amount is A is acquired. A numerical value obtained by dividing the average luminance by the average luminance (target luminance for X) of the ideal output which corresponds to the reference image data, whose frequency is zero and whose feature amount other than frequency equals to A is defined as the target reduction rate corresponding to the feature amount A.

To correct the image in accordance with the output of a specific target device, an average observation distance D_t between the target device output and the observer can be used. An average observation distance D_m between the observer and the output after correction using the parameters calculated by the correction parameter calculation unit 42 will also be used. That is, D_m is the average observation distance between the observer and the output in the output correction mode to be described later. The correction parameter calculation unit 42 acquires D_t and D_m, and calculates a distance ratio dRatio=D_t/D_m. The correction parameter calculation unit 42 uses the distance ratio dRatio to calculate the correction parameters. FIG. 14 is a schematic view showing the distance ratio dRatio.

Referring to FIG. 14, reference numeral 1901 denotes an observer; 1902, an output by a correction target device, in other words, the output unit 22 or a device of the same type as the output unit 22; and 1903, an output of a device which is a target for the color matching. The observation distances D_t and D_m are not the distances between the output unit and the measuring device at the time of the above-described measurement. The observation distances D_t and D_m are the distances between the observer and the output when observing the outputs from these devices in an actual application example. The observation distances will be irrelevant when correcting the image to an ideal color. In this case, dRatio can be set to 1.

The correction parameter calculation unit 42 obtains the correction parameter H_y for the frequency in the Y direction from the measured reduction rate Rf_m_y and the target reduction rate Rf_t_y. The correction parameter calculation unit 42 also obtains the correction parameter H_x for the frequency in the X direction from the measured reduction rate Rf_m_x and the target reduction rate Rf_t_x. The correction parameters H_y and H_x are calculated by $$H\_y(\omega, ct, Ave)=(Rf\_t\_y(\omega \times dRatio, ct, Ave)/Rf\_m\_y(\omega, ct, Ave)) \quad (20)$$

$$H\_x(\omega, ct, Ave)=(Rf\_t\_x(\omega \times dRatio, ct, Ave)/Rf\_m\_x(\omega, ct, Ave)) \quad (21)$$

That is, a numerical value obtained by dividing the target reduction rate by the measured reduction rate is acquired as a correction parameter. When the frequency of the reference image data in the X direction is ω, the average pixel value of the reference image data is Ave, and the contrast of the reference image data is ct, the correction parameter is represented by H_x(ω, ct, Ave). When the frequency of the reference image data in the Y direction is ω, the average pixel value of the reference image data is Ave, and the contrast of the reference image data is ct, the correction parameter is represented by H_y(ω, ct, Ave).

In equations (20) and (21), the frequency ω that is an argument of the target data Rf_t_y and Rf_t_x is multiplied by dRatio. This is done because the distance between the target for the color matching and the correction target device is different. Then, even if the two outputs have the same frequency, the frequency of the output from the target visible for the observer is dRatio times higher than the output of the correction target device visible for the observer. In other words, this multiplication makes the frequency scales of the two outputs match.

To calculate the correction parameters H_y and H_x for the frequency ω, the target data Rf_t_y and Rf_t_x for the frequency ω×dRatio are used. However, the target and measured data storing unit 41 may not store the target data for the frequency ω×dRatio. In this case, using an estimation method such as linear interpolation based on Rf_t_y and Rf_t_x for an adjacent frequency enables to calculate the target data for the frequency ω×dRatio. More specifically, target data for the frequency y can be obtained by linear interpolation using target data (set value y1) for an image y1 with a frequency y1 and target data (set value y2) for an image y2 with a frequency y2. FIGS. 15A and 15B show the correction parameters calculated by the correction parameter calculation unit 42. Note that 2001 in FIG. 15A indicates correction parameters for the frequency in the Y direction, and 2002 in FIG. 15B indicates correction parameters for the frequency in the X direction.

Finally, the correction parameter calculation unit 42 transfers the calculated correction parameters to the correction parameter-storage unit 14 of the image correction device 1 (step S110).

The processing in the "output measurement mode" thus ends. With the processing described above, the correction parameter-storage unit 14 stores the correction parameters, and image color correction comes to be ready.

[Output Correction]

Figure 16:
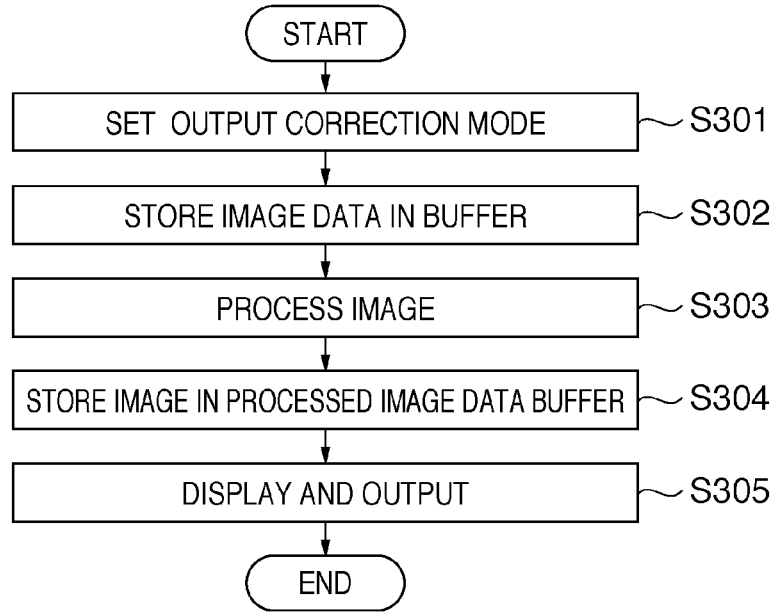
FIG. 16 is a flowchart illustrating processing in a output correction mode.

The output correction mode in which an image is corrected using correction parameters and output will be described below. The "output correction mode" of the image processing apparatus according to this embodiment will be described with reference to the flowchart of FIG. 16. First, the output mode setting unit 11 acquires a user instruction, and sets the output mode to the output correction mode (step S301).

Figure 17:
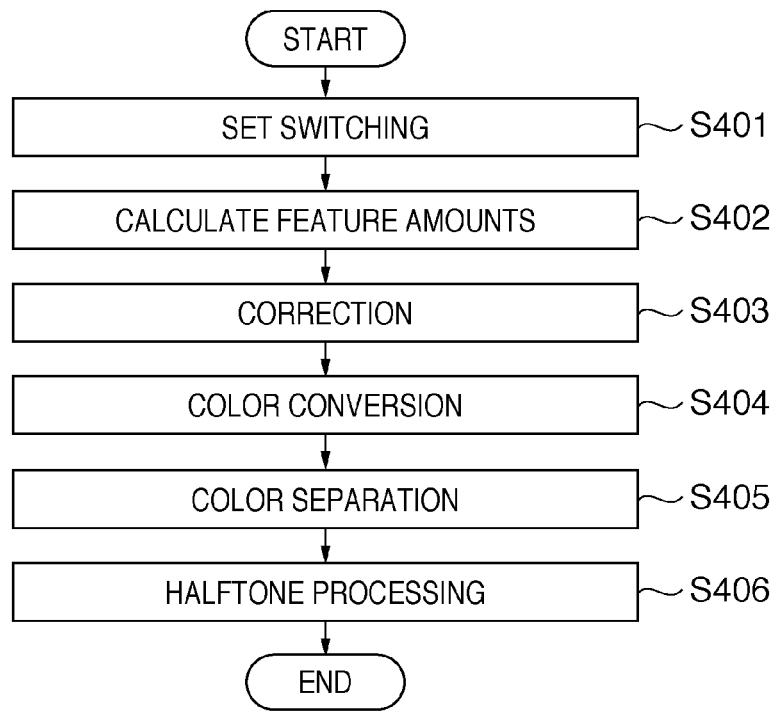
FIG. 17 is a flowchart illustrating details of image processing in step S303.

Next, the image data acquisition unit 12 acquires and stores an input image as image data (step S302). In the output correction mode, an arbitrary image can be acquired as image data. The image processing unit 13 processes the image data stored in the image data acquisition unit 12 (step S303). A detailed operation of the image processing unit 13 according to this embodiment in the output correction mode will be described below with reference to the block diagram of FIG. 8 and the flowchart of FIG. 17.

The output mode setting unit 11 sets the switching unit 131 based on the setting acquired from the user (step S401). If the output mode setting unit 11 instructs the output correction mode, the color conversion unit 132 acquires image data via the feature amount calculation unit 138 and the correction unit 139. The feature amount calculation unit 138 calculates the feature amounts near a pixel of interest using a plurality of spatial filters for it. The pixel of interest is one pixel of the input image represented by the image data stored in the image data acquisition unit 12. The feature amount calculation unit 138 repeatedly performs the calculation, thereby calculating the feature amounts of each pixel of the input image (step S402). In this embodiment, the spatial frequency, contrast, and average pixel value are obtained as the feature amounts.

In this embodiment, for example, six sets of spatial filters are defined for each of the X and Y directions to calculate the spatial frequency and contrast. In addition, one set of spatial filters is set for each of the X and Y directions to calculate the average pixel value. The number of filters may change. In this embodiment, one-dimensional filters in the X or Y direction are defined. However, one-dimensional filters in other directions, for example, oblique directions may be defined. Alternatively, two-dimensional filters may be defined.

When the spatial filters to be used to calculate the spatial frequency and contrast of the embodiment are defined as $F\_X(n)$ and $F\_Y(n)$ ($1 \leq n \leq 6$), equations to be used to calculate the spatial frequency and contrast are given by $$R\_c(n) = R * F\_X(n) \quad (22)$$

$$G\_c(n) = G * F\_X(n) \quad (23)$$

$$B\_c(n) = B * F\_X(n) \quad (24)$$

$$R\_c(n+6) = R * F\_Y(n) \quad (25)$$

$$G\_c(n+6) = G * F\_Y(n) \quad (26)$$

$$B\_c(n+6) = B * F\_Y(n) \quad (27)$$

($1 \leq n \leq 6$, and * indicates convolution)
Note that adding 6 to the argument on the left-hand side of each of equations (25) to (27) will be described later.

Figure 19:
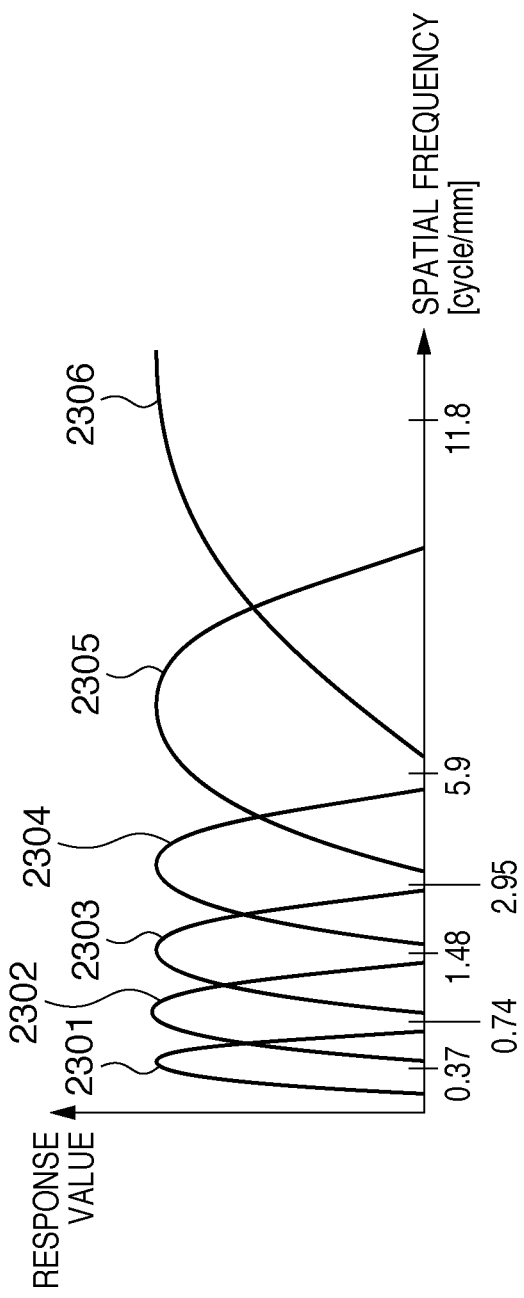
FIG. 19 is a graph showing the characteristics of filters used in step S402.

FIGS. 18A to 18D show two sets of representative filters out of the spatial filters to be used to calculate the spatial frequency and contrast feature amounts according to the embodiment. FIG. 19 shows the spatial frequency characteristics of the six sets of spatial filters according to the embodiment. Filters having other numerical values and other spatial frequency characteristics may be used, as a matter of course.

A filter 3101 in FIG. 18A is a filter $F\_X(1)$ to be used to extract the lowest spatial frequency and contrast in the X direction. In this embodiment, the filter 3101 corresponds to a spatial frequency of 0.369 cycle/mm, in other words, 2301 in FIG. 19. A filter 3102 in FIG. 18B is a filter $F\_X(6)$ to be used to extract the highest spatial frequency and contrast in the X direction, and corresponds to 2306 in FIG. 19. The six sets of filters used in this embodiment correspond to frequencies of $0.369 \times \text{Power}(2, n-1)$ ($1 \leq n \leq 6$), respectively.

Similarly, a filter 3103 in FIG. 18C is a filter $F\_Y(1)$ to be used to extract the lowest spatial frequency, in other words, the spatial frequency of 0.369 cycle/mm and contrast in the Y direction. A filter 3104 in FIG. 18D is a filter $F\_Y(6)$ to be used to extract the highest spatial frequency and contrast in the Y direction.

When the spatial filters to be used to calculate the average pixel value of this embodiment are defined as $Fa\_X$ and $Fa\_Y$, equations to be used to calculate the average pixel value are given by $$R\_aveX = R * Fa\_X \quad (28)$$

$$G\_aveX = G * Fa\_X \quad (29)$$

$$B\_aveX = B * Fa\_X \quad (30)$$

$$R\_aveY = R * Fa\_Y \quad (31)$$

$$G\_aveY = G * Fa\_Y \quad (32)$$

$$B\_aveY = B * Fa\_Y \quad (33)$$

(* indicates convolution)

Figure 4A:
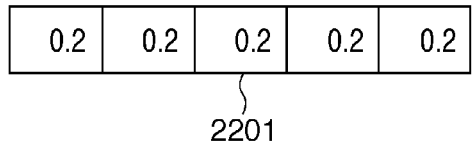
FIGS. 4A and 4B are views showing examples of filters to be used to calculate an average pixel value in step S402.
Figure 4B:
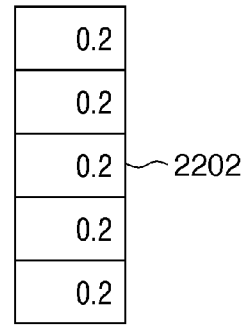

FIGS. 4A and 4B show spatial filters to be used to calculate the average pixel value according to the embodiment. A filter 2201 in FIG. 4A is a filter $Fa\_X$ to be used to extract the average pixel value in the X direction. A filter 2202 in FIG. 4B is a filter $Fa\_Y$ to be used to extract the average pixel value in the Y direction.

The correction unit 139 selects a correction parameter stored in the correction parameter-storage unit 14, which corresponds to the feature amount calculated by the feature amount calculation unit 138 for the pixel of interest (parameter acquisition). The pixel of interest is one pixel of the image represented by the image data. The correction unit 139 calculates the pixel value after correction (corrected pixel value) using the selected correction parameter and the value of the pixel of interest. The correction unit 139 performs this processing for each pixel of the image represented by the image data, thereby acquiring corrected image data (step S403).

To select the correction parameter, the above-described feature amounts $R\_c(n)$, $G\_c(n)$, $B\_c(n)$, $R\_c(n+6)$, $G\_c(n+6)$, $B\_c(n+6)$, $R\_aveX$, $G\_aveX$, $B\_aveX$, $R\_aveY$, $G\_aveY$, and $B\_aveY$ are used. In this embodiment, correction parameter selection for G out of R, G, and B will be explained. For R and B, the same processing as that for G may be executed. Alternatively, the correction parameter calculated for G may be applied to R and B.

First, the correction unit 139 obtains a value m that maximizes $G\_c(m)$, thereby determining a frequency feature amount $M\_g$ given by $$M\_g = \text{Max}\_m(G\_c(m)) \ (1 \leq m \leq 12) \quad (34)$$

A function $\text{Max}\_m(G\_c(m))$ of equation (34) returns m that maximizes $G\_c(m)$. The range of m is $1 \leq m \leq 12$ because the feature amounts in the X and Y directions are calculated, as indicated by equations (23) and (26).

The above-described frequency $M\_g$ does not represent the actual spatial frequency. Hence, $M\_g$ needs to be converted into an actual spatial frequency $M\_fg$. In this embodiment, the actual spatial frequency $M\_fg$ is calculated in accordance with the following equations. Note that 0.369 [cycle/mm] is the center frequency of the filter corresponding to the lowest frequency in the six sets of filters, as shown in FIG. 19.

When $1 \leq M\_g \leq 6$, $$M\_fg = 0.369 \times \text{Power}(2, M\_g-1) \quad (35)$$

When $7 \leq M\_g \leq 12$, $$M\_fg = 0.369 \times \text{Power}(2, M\_g-7) \quad (36)$$

Next, the correction unit 139 calculates the maximum value of G_c(m), thereby determining a contrast feature amount M_cg given by $$M\_cg = \text{Max}\_G\_c(G\_c(m)) \ (1 \leq m \leq 12) \quad (37)$$

A function Max_G_c(G_c(m)) on the right-hand side of equation (37) returns the maximum value of G_c(m).

In addition, the correction unit 139 determines whether to obtain the average pixel value in the X direction or the average pixel value in the Y direction from M_g represented by equation (34), thereby determining an average pixel value Ave_mg corresponding to the direction. For example, the average pixel value Ave_mg can be determined as follows.

When $1 \leq M\_g \leq 6$, $$\text{Ave}\_mg = G\_\text{ave}X \quad (38)$$

When $7 \leq M\_g \leq 12$, $$\text{Ave}\_mg = G\_\text{ave}Y \quad (39)$$

Using the frequency feature amount M_fg, contrast feature amount M_cg, and average pixel value Ave_mg obtained by the above-described calculations, the correction unit 139 selects a target correction parameter H_pg from the parameters H_x and H_y held in the correction parameter-storage unit 14. More specifically, the correction parameter can be selected in the following way.

When $1 \leq M\_g \leq 6$, $$H\_pg = H\_x(M\_fg, M\_cg, \text{Ave}\_mg) \quad (40)$$

When $7 \leq M\_g \leq 12$, $$H\_pg = H\_y(M\_fg, M\_cg, \text{Ave}\_mg) \quad (41)$$

The correction unit 139 corrects the pixel value based on the selected correction parameter. At the time of selection, the correction parameter-storage unit 14 does not always have H_x or H_y having the frequency M_fg, contrast M_cg, and average pixel value Ave_mg as arguments. In this case, the correction unit 139 replaces the frequency M_fg, contrast M_cg, and average pixel value Ave_mg with the closest values prepared in the correction parameter-storage unit 14 in advance, and uses the replaced values as the arguments. The correction unit 139 then obtains the correction parameters H_x and H_y. As another method, the correction unit 139 may linearly interpolate the frequency ω, contrast ct, average pixel value Ave, and correction parameters H_x and H_y held in the correction parameter-storage unit 14 in advance. The correction unit 139 may thus obtain the correction parameters H_x and H_y corresponding to the frequency M_fg, contrast M_cg, and average pixel value Ave_mg.

The correction processing is represented by $$G\_p = G \times H\_pg \quad (42)$$

Correction of G out of R, G, and B is thus completed. As described above, correcting R and B as well enables to generate corrected signals R_p, G_p, and B_p. In some cases, the correction parameter-storage unit 14 may not have the correction parameters corresponding to the frequency feature amount M_fg, contrast feature amount M_cg, and average pixel value Ave_mg. Then, the correction unit 139 may estimate the correction parameters corresponding to the feature amounts using acquirable correction parameters. For example, the correction unit 139 may acquire a correction parameter by interpolating a plurality of correction parameters corresponding to the frequency feature amount M_fg.

In this embodiment, the feature amount calculation unit 138 and the correction unit 139 calculate feature amounts near each of the pixels of the image represented by the image data and perform correction. However, only the pixel values of pixels within a designated region may be corrected. It is also possible to calculate feature amounts in a designated region of an image, and correct the pixels in the designated region using one parameter obtained by the feature amount calculation.

Next, the color conversion unit 132 converts the corrected image data R_p, G_p, and B_p into R', G', and B' data by looking up the color conversion LUT 133 (step S404).

$$R' = R\_\text{LUT}\_3D(R\_p, G\_p, B\_p) \quad (43)$$

$$G' = G\_\text{LUT}\_3D(R\_p, G\_p, B\_p) \quad (44)$$

$$B' = B\_\text{LUT}\_3D(R\_p, G\_p, B\_p) \quad (45)$$

The functions on the right-hand sides of equations (43) to (45) correspond to the contents of the color conversion LUT 133.

Color conversion of this embodiment is thus completed. Color separation (step S405) and halftone processing (step S406) are the same as in steps S203 and S204, respectively, and a detailed description thereof will not be repeated. The operation of the image processing unit 13 according to this embodiment in the output correction mode is thus completed. Note that in this embodiment, the correction target signals are R, G, and B. Needless to say, the correction may be done for CMYK data obtained by color separation.

The processed image data storage unit 21 acquires and stores the image data generated by the processing of the image processing unit 13 (step S304). The display/output unit 22 outputs the image data stored in the processed image data storage unit 21 (step S305). Processing in the "output correction mode" thus ends. With the above-described processing, an image obtained by causing the image processing unit 13 to correct, using a correction parameter held in the correction parameter-storage unit 14, image data acquired by the image data acquisition unit 12 is output.

As described above, according to this embodiment, color correction of a pixel of interest is performed using color correction parameters corresponding to the spatial frequency, spatial frequency direction, and pixel value distribution near the pixel of interest, thereby improving the accuracy of color matching for a high-resolution image. It is consequently possible to correct and output the color of a high-resolution image to be output from a given device such that it matches with the color to be output from another device. It is also possible to correct the color of a high-resolution image to be output from a device to an ideal color. In this embodiment, the spatial frequency, frequency direction, contrast, and average pixel value are used as the feature amounts. However, other feature amounts such as the mode, median, minimum value, maximum value, and the like of a pixel value may be used.

<Second Embodiment>

In the first embodiment, the units included in the devices shown in FIG. 5 are implemented as hardware. However, the units may be implemented as software. In this case, the software is held in various kinds of storage devices provided in a computer. A CPU executes the software so that the computer can implement the functions of the units shown in FIG. 5.

Figure 1A:
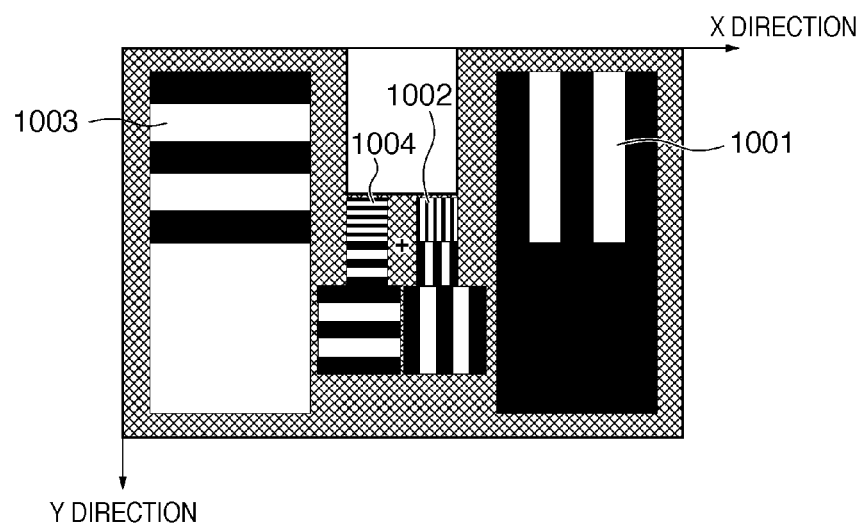
FIGS. 1A and 1B illustrate outputs of a liquid crystal display that is an intensity modulation type output device.
Figure 1B:
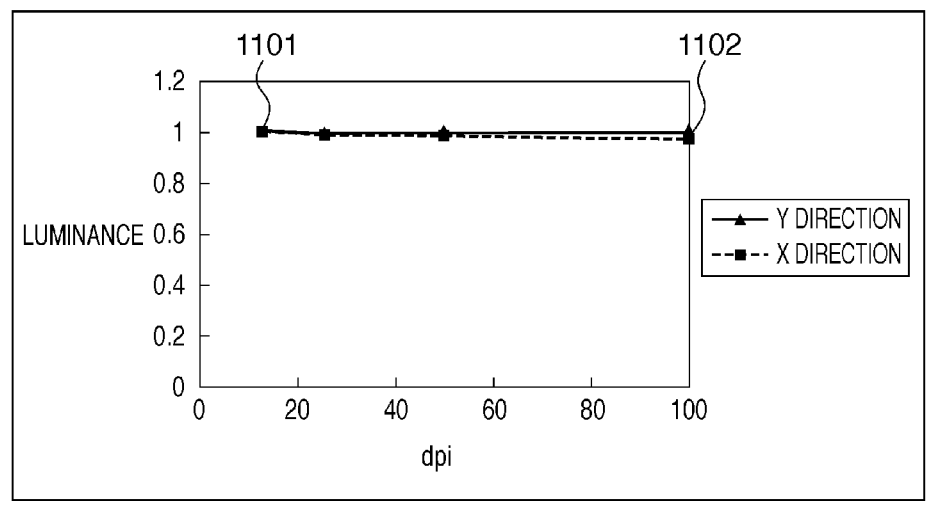
Figure 3:
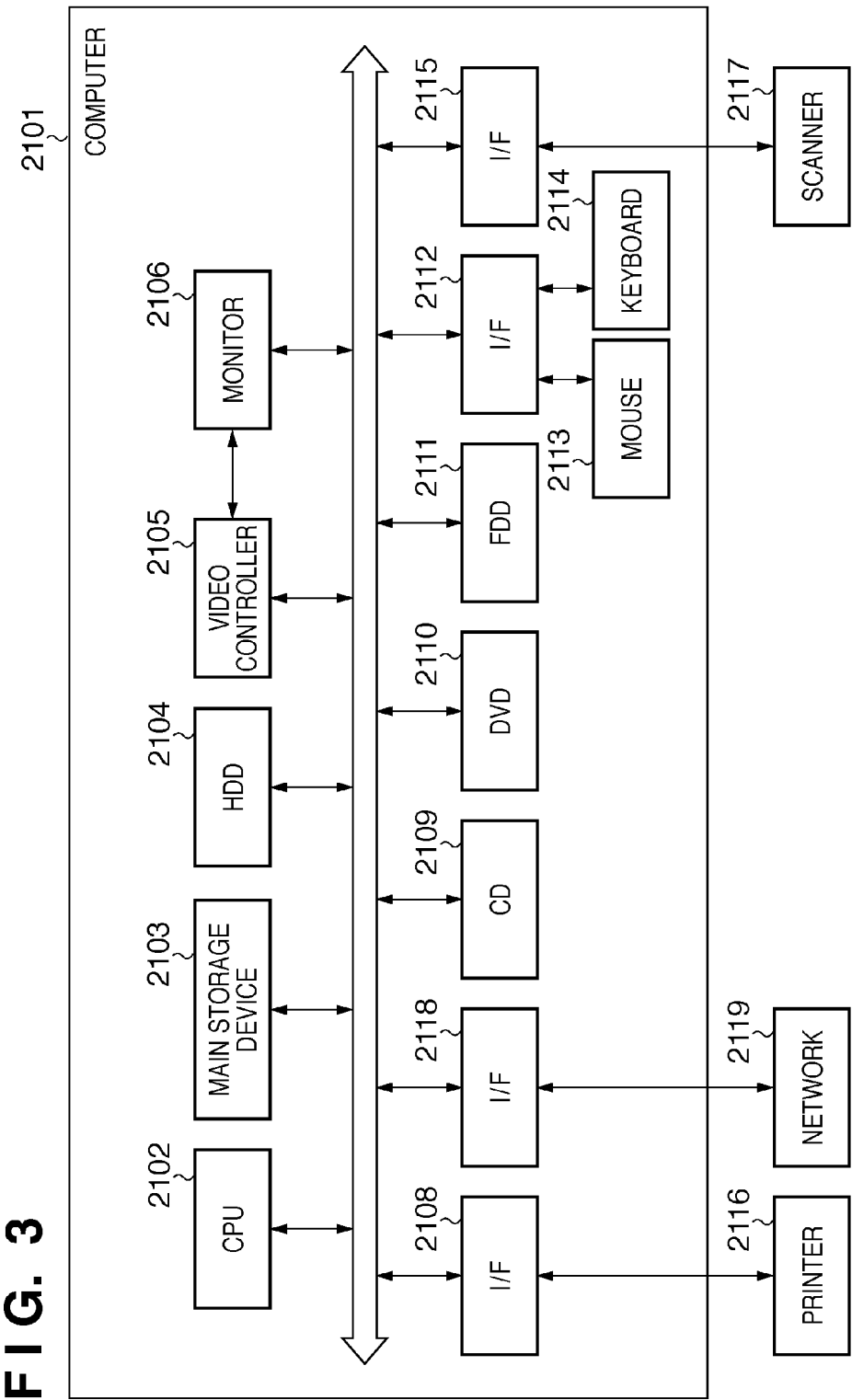
FIG. 3 is a block diagram showing the electrical arrangement of an image processing apparatus according to the second embodiment.

FIG. 3 is a block diagram showing the hardware configuration of a computer applicable to this embodiment. A computer 2101 is a general-purpose information processing apparatus such as a popular personal computer. Blocks to be described later are connected via a bus 2107 in the computer 2101. The bus 2107 enables transfer of various kinds of data between the blocks.

Note that the apparatus to which the computer 2101 is applied does not always need all constituent elements shown in FIG. 3. In that case, some of the constituent elements shown in FIG. 3 can be omitted. Alternatively, some of the constituent elements shown in FIG. 3 may be replaced with hardware having the same function. The computer 2101 may be formed from a plurality of computers.

Referring to FIG. 3, a CPU 2102 controls the entire computer 2101 using programs and data loaded to a main storage device 2103. The CPU 2102 also executes the above-described processing to be performed by the image processing apparatus to which the computer 2101 is applied. The main storage device 2103 is represented by a RAM. The main storage device 2103 has an area to temporarily store programs and data read out from various storage devices. The storage devices include an HDD (Hard Disk Drive) 2104, CD drive 2109, DVD drive 2110, and FDD (Floppy® Disk Drive) 2111. The main storage device 2103 also has an area to temporarily store image data acquired from a scanner 2117 via an I/F (interface) 2115. The main storage device 2103 also has a work area to be used by the CPU 2102 to execute various kinds of processing. That is, the main storage device 2103 can provide various information recording areas as needed.

The HDD 2104 stores the OS (Operating System) and various kinds of images (including document images). The HDD 2104 also stores programs and data to be used by the CPU 2102 to control the functions of the units shown in FIG. 3 or execute the above-described processing which is performed by the apparatus to which the computer 2101 is applied. The programs and data stored in the HDD 2104 are loaded to the main storage device 2103 as needed under the control of the CPU 2102 and processed by the CPU 2102. Note that several pieces of information described to be stored in the main storage device 2103 may be stored in the HDD 2104.

A video controller 2105 sends, to a monitor 2106, display data including image data and character data received from the main storage device 2103 or HDD 2104 as signals. The monitor 2106 is formed from a CRT, liquid crystal panel, or the like. The monitor 2106 displays an image, characters, or the like based on the signals received from the video controller 2105.

An I/F 2108 connects a printer 2116 to the computer 2101. The computer 2101 can transmit print data to the printer 2116 via the I/F 2108, and receive the status information of the printer 2116 transmitted from the printer 2116. The CD drive 2109 reads out programs and data recorded on a CD serving as a storage medium, and sends the readout programs and data to the HDD 2104, main storage device 2103, or the like.

The DVD drive 2110 reads out programs and data recorded on a DVD serving as a storage medium, and sends the readout programs and data to the HDD 2104, main storage device 2103, or the like. The FDD 2111 reads out programs and data recorded on a floppy® disk serving as a storage medium, and sends the readout programs and data to the HDD 2104, main storage device 2103, or the like.

Reference numerals 2113 and 2114 denote a mouse and a keyboard, respectively, each of which serves as an operation input device. The user of the computer 2101 can input various instructions to the CPU 2102 by operating the mouse 2113 or keyboard 2114. An I/F 2112 connects the keyboard 2114 and the mouse 2113 to the bus. An operation instruction input by the user using the mouse 2113 or keyboard 2114 is sent to the CPU 2102 via the I/F 2112 as a signal.

The I/F 2115 connects the scanner 2117 that generates image data by reading a document, film, or the like to the computer 2101. Image data generated by the scanner 2117 is sent to the HDD 2104, main storage device 2103, or the like via the I/F 2115. An I/F 2118 communicates information with another electronic device such as a computer. Information acquired from a network 2119 based on an instruction of the CPU 2102, which may include image data, is sent to the HDD 2104, main storage device 2103, or the like via the I/F 2118.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-124721, filed 22 May 2009, which is hereby incorporated by reference herein in its entirety.

What is claimed is:

1. An image processing apparatus comprising:
a calculation unit configured to calculate, based on a pixel value of a pixel of interest and a pixel value of a pixel around the pixel of interest, a spatial frequency around the pixel of interest and a feature amount which is represented by using a difference between the pixel value of the pixel of interest and pixel values around the pixel of interest;
a storage unit configured to store correction parameters corresponding to sets of the spatial frequency and the feature amount;
an acquisition unit configured to acquire, from said storage unit, a correction parameter corresponding to the calculated spatial frequency and the calculated feature amount, as a correction parameter for a region including the pixel of interest and pixels around the pixel of interest, wherein a correction parameter corresponding to a higher spatial frequency is configured to provide a correction making each and every luminance of the entirety of the region brighter than a correction parameter corresponding to a lower spatial frequency, or a correction parameter corresponding to a larger feature amount is configured to provide a correction making each and every luminance of the entirety of the region brighter than a correction parameter corresponding to a smaller feature amount; and
a correction unit configured to correct a luminance of the region using the acquired correction parameter;
wherein the feature amount includes a first feature amount which is represented by using a difference between the pixel value of the pixel of interest and pixel values around the pixel of interest and a second feature amount which is represented by any one of an average value, a mode value, a median value, a minimum value or maximum value between the pixel value of the pixel of interest and pixel values around the pixel of interest, wherein the higher the spatial frequency is, the larger the first feature amount is, and the higher the second feature amount is, the brighter the correction unit corrects the luminance of the entirety of the region.

2. The apparatus according to claim 1, wherein said acquisition unit estimates the correction parameter using the correction parameters held by said storage unit.

3. The apparatus according to claim 1, wherein a second feature amount of pixel values around the pixel of interest is calculated and used in acquiring the correction parameter, wherein the second feature amount includes at least one of a maximum value of the pixel values, a minimum value of the pixel values, a median of the pixel values, a mode of the pixel values, a difference between the maximum value of the pixel values and the minimum value of the pixel values, a contrast, and a frequency direction.

4. The image processing apparatus according to claim 1, wherein the pixel value of interest after the correction is a product of the pixel value of interest and a single value which is the acquired correction parameter.

5. The image processing apparatus according to claim 1, wherein the calculation unit is further configured to calculate the spatial frequency around the pixel of interest through a convolution operation using a plurality of spatial filters.

6. A non-transitory computer-readable storage medium storing a computer program which causes a computer to function as units of an image processing apparatus of claim 1.

7. An image processing method comprising:
a calculation step of calculating, based on a pixel value of a pixel of interest and a pixel value of a pixel around the pixel of interest, a spatial frequency around the pixel of interest, and a feature amount which is represented by using a difference between the pixel value of the pixel of interest and pixel values around the pixel of interest;

an acquisition step of acquiring, from a storage unit configured to store correction parameters corresponding to sets of the spatial frequency and the feature amount, a correction parameter corresponding to the calculated spatial frequency and the calculated feature amount, as a correction parameter for a region including the pixel of interest and pixels around the pixel of interest, wherein a correction parameter corresponding to a higher spatial frequency is configured to provide a correction making each and every luminance of the entirety of the region brighter than a correction parameter corresponding to a lower spatial frequency, or a correction parameter corresponding to a larger feature amount is configured to provide a correction making each and every luminance of the entirety of the region brighter than a correction parameter corresponding to a smaller feature amount; and a correction step of correcting the a luminance of the region using the acquired correction parameter;

wherein the feature amount includes a first feature amount which is represented by using a difference between the pixel value of the pixel of interest and pixel values around the pixel of interest and a second feature amount which is represented by any one of an average value, a mode value, a median value, a minimum value or maximum value between the pixel value of the pixel of interest and pixel values around the pixel of interest, wherein the higher the spatial frequency is, the larger the first feature amount is, and the higher the second feature amount is, the brighter the correcting of the luminance of the entirety of the region in the correction step.

* * * * *